US012688034B2

(12) United States Patent
Chen et al.

(10) Patent No.: US 12,688,034 B2
(45) Date of Patent: Jul. 21, 2026

(54) APPLICATION MIGRATION METHOD FROM CLIENT-SERVER ARCHITECTURE TO BLOCKCHAIN ARCHITECTURE

(71) Applicant: FUZHOU UNIVERSITY, Fuzhou (CN)

(72) Inventors: Xing Chen, Fuzhou (CN); Liqiang Lin, Fuzhou (CN); Hanlin Chen, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 268 days.

(21) Appl. No.: 18/739,408

(22) Filed: Jun. 11, 2024

(65) Prior Publication Data

US 2024/0370256 A1    Nov. 7, 2024

Related U.S. Application Data

(63) Continuation of application No. PCT/CN2023/097419, filed on May 31, 2023.

(30) Foreign Application Priority Data

Apr. 7, 2023    (CN) .......................... 202310366690.1

(51) Int. Cl.
G06F 9/44    (2018.01)
G06F 8/72    (2018.01)
G06F 8/75    (2018.01)

(52) U.S. Cl.
CPC . *G06F 8/72* (2013.01); *G06F 8/75* (2013.01)

(58) Field of Classification Search
CPC ..................................... G06F 8/72; G06F 8/75
See application file for complete search history.

(56) References Cited

U.S. PATENT DOCUMENTS

2020/0042706 A1    2/2020  Allen et al.
2021/0360005 A1*  11/2021  Bae ........................... G06N 5/04
2022/0067172 A1*   3/2022  Bonetta ................. G06F 21/577

FOREIGN PATENT DOCUMENTS

CN    113157723 A    7/2021

OTHER PUBLICATIONS

Zhanghui Liu, et al., The Transformation from Traditional Application to Blockchain-Based Application, BlockSys, 2019, pp. 483-488.

(Continued)

*Primary Examiner* — Hang Pan
(74) *Attorney, Agent, or Firm* — Bayramoglu Law Offices LLC

(57)    ABSTRACT

An application migration method from client-server architecture to blockchain architecture is provided. The application migration method includes the following steps: S1: modeling an application program of a conventional client-server architecture and abstracting the application program to a program call tree; S2: defining a taint propagation rule for taint analysis by taking key data as tainted data, to acquire all taint variables in the application program; and S3: identifying a key module of the application program on the program call tree according to a tainted path, and setting a code refactoring rule to perform code refactoring on a method in the key module according to a special program structure.

9 Claims, 3 Drawing Sheets

(56)  References Cited

OTHER PUBLICATIONS

Wang Yi-Lan, et al., Backdoor Detection for Java Language based On Static Analysis, Netinfo Security, 2012, pp. 43-45.
Yu Zhi-Yong, et al., SQL Access Framework for Hyperledger Fabric, Computer Science, 2021, pp. 54-61, vol. 48 No. 11.
David Brumley, et al., Privtrans: Automatically Partitioning Programs for Privilege Separation, USENIX Association, 2004, pp. 1-16.

* cited by examiner

```
1  //source code, where c and d are external variables
2  Object Method_T(int a,int b){
3      d = a + b + c;
4      return null;
5  }
6
```

FIG. 2A

```
1  //target code of the method wrapper, where c and d are external variables
2  Result Method_T_Wrapper(Params params,int a,int b){
3      this.global_params = params;        //assign params to global varaibles global_params
4      global_params.d = a + b + global_params.c;
5      Result res = new Result();
6      res.params = global_params;
7      res.data = null;
8      return res;
9  }
10 class Params {
11     int c,d;        //external variables
12 }
Params {
     int c,d;        //external variables
}
Result {
     Params params;  //added returned values
     Object data;    //original method returned values
}
```

FIG. 2B

```
//source code, where c and d are external variables
Object Method_T(int a, int b){
    d = a + b + c;
    return null;
}
```

FIG. 3A

```
public Object Method_T_Proxy(int a, int b) {
    try{
        Params params = new Params();
        params.c = c;
        params.d = d;
        //call an initial function of a chain code
        fabricManager.init();
        //execute the method of the Method_T_Wrapper in a smart contract
        Result res = fabricManager.invoke("Method_T_Wrapper",JSON.parseString(params),a,b);
        //Serialize a returned query result
        c = res.params.c;
        d = res.params.d;
        return res.data;
    }
    catch (Exception e){
        e.printStackTrace();
    }
}
```

FIG. 3B

APPLICATION MIGRATION METHOD FROM CLIENT-SERVER ARCHITECTURE TO BLOCKCHAIN ARCHITECTURE

CROSS-REFERENCE TO THE RELATED APPLICATIONS

This application is a continuation application of International Application No. PCT/CN2023/097419, filed on May 31, 2023, which is based upon and claims priority to Chinese Patent Application No. 202310366690.1, filed on Apr. 7, 2023, the entire contents of which are incorporated herein by reference.

TECHNICAL FIELD

The present invention relates to the technical field of blockchain, and particularly relates to an application migration method from client-server architecture to blockchain architecture.

BACKGROUND

With rapid development of the blockchain technology, many organizations now try a blockchain solution. In this newborn stage, due to scarcity of experts in the field of blockchain, a tendency of converting a legacy system automatically into a system based on blockchain is increasingly large. However, it is a challenge to transition from the prior art to the blockchain technology. In the industry, the blockchain solution is only developed started from scratch or a database terminal of an original application is only transformed. The former needs a lot of time and money with a huge cost, and the latter cannot be guaranteed in safety.

SUMMARY

In view of this, an object of the present invention is to provide an application migration method from client-server architecture to blockchain architecture, which can effectively improve the development efficiency of the blockchain application.

To achieve the above object, the present invention adopts the following technical solution: an application migration method from client-server architecture to blockchain architecture includes the following steps: S1: modeling an application program of a conventional client-server architecture and abstracting the application program to a program call tree; S2: defining a taint propagation rule for taint analysis by taking key data as tainted data, to acquire all taint variables in the application program; and S3: identifying a key module of the application program on the program call tree according to a tainted path, and setting a code refactoring rule to perform code refactoring on a method in the key module according to a special program structure.

In a preferred embodiment, the S1 specifically includes: establishing the program call tree, constructing the program call tree of the application program from the main function through static code analysis, and marking the key data on the program call tree; and definitions of the program call tree are as follows:

Definition 1: the program structure of an application program of client-server architecture is represented as a program call tree $Tree_r=(M, R, K)$, where $M=\{m_1, m_2, \ldots, m_n\}$ represents a node set of the program call tree; R represents a node call relationship set, any one $r_{mi-mj} \in R$ represents a side of the program call tree, representing that a method $m_i$ calls a method $m_j$ and $K=\{keydata_1, keydata_2, \ldots, keydata_n\}$ represents a key data set in a system;

definition 2: a method node of a program call tree includes a unique identifier and a call path of the method, a statement set of the method and a set of the key data in the method, and $m_i=<mSign_i, mPath, U_i, kset>$ is represented by a quaternion, where mSign represents the unique identifier of the method $m_i$, mPath represents a method call path from the main function to $m_i$, kset is used to record all key data in the method $m_i$, and $U_i$, represents the statement set of the method $m_i$;

definition 3: $mSign_i=\{mSig|mName,mParams,returnParams\}$ represents the unique identifier of a method node of a program call tree, where mName represents a method name, mParams represents an entry parameter list of the method, and returnParams represents return parameters of the method;

definition 4: $mPath=\{mSig_{main}, mSig_a, \ldots, mSig_i\}$ represents the call path of a program call tree method $m_i$, a combination of the unique identifiers of the method node from $m_{main}$ to $m_i$, uniquely forming a path accessible to $m_i$;

definition 5:

$$U_i = \{u_i^1, u_i^2, \ldots, u_i^n\}$$

represents the statement set of the method node $m_i$ on the program call tree, where $$u_i^j$$

represents the $j^{th}$ statement of the method $m_i$; and definition 6: the key data of a system includes the unique identifier of the key data in the method and a key data name, and $eydata_i=\{mSign_i, kname\}$ is represented by a two-tuple, where kname represents a variable in the method $m_i$ with a name of kname, and variables on a data flow branch where all key data is located may be key variables.

In a preferred embodiment, an algorithm extracted by the program call tree constructs a program call tree of an application taking $m_{main}$ as a root by taking the main function $m_{main}$ as an entry point of the application, a Hash-Map is used to record a R, a storage form of key is $<m_i, m_j>$, formula represents that $m_i$ calls $m_j$ and a value corresponding thereto represents a number of times when $m_i$ calls $m_j$ for the entry point $m_{main}$ of the input program of the algorithm and the statement set $U_{main}$ of $m_{main}$, any $$u_{main}^j \in U_{main}$$

represents the $i^{th}$ statement of $U_{main}$; the program call tree is constructed recursively by calling a method getTree( ), where parameters $m_a$ and $U_a$ are written into the method, respectively representing a method to be analyzed and the statement set of the method; where a Soot key word of $$u_a^i$$

is acquired, i.e., an intermediate code defined in Soot; a set M is updated to record that the method ma calls the method $m_s$; a set R is updated to record a method call relationship and update a weight; the method $m_s$ is subjected to getTree( ) recursion; and when the recursion process is ended, the algorithm outputs the program call tree.

In a preferred embodiment, the assignment statement rule and the alias statement rule in the taint propagation rule in the S2 summarize the various ways of the taint variables propagation in a method; a method call statement rule, a method return statement rule and a method declaration statement rule describe cross-method propagation modes of the taint variables; first, for each method node containing the key data, each statement in the method is analyzed according to the taint propagation rule, and when the statement meets any taint propagation rule, it is indicated that a new taint source is found, and the new taint source is added into a taint source set for recording; wherein when the statement meets the method call statement rule, the method return statement rule or the method declaration statement rule, it is indicated that a new method node to be analyzed is generated, and the method node needs to be added into a set of the method node to be analyzed for recording; after a round of analysis of all statements of the method is ended, if the new taint source is added into the taint source set, a new round of iteration is started to analyze the method; and finally, the set of the method node to be analyzed is traversed to analyze each method node in the set one by one.

In a preferred embodiment, the S3 includes key module identification, program structure and method wrapper generation, method proxy construction and Java Data Base Connectivity (JDBC) refactoring.

In a preferred embodiment, the step of key module identification specifically includes: when a kset set of a method node $m_{cur}$ is non-empty and a kset set of a father method node thereof is empty, taking a sub-tree with $m_{cur}$ as a root node a key code module of the application, where the key code module is specifically defined as follows:

definition 7: the key code module of the application program is represented as Module=(module$_1$, module$_2$ . . . module$_n$), Module∈Tree$_r$, where module$_i$ is a sub-tree of Tree$_{main}$, representing a key code mode of the application program and being represented as module$_i$=<M,R>(if i≠j, module$_i$∩module$_j$=∅); identifying the key module: first, adding the root node $m_a$ into a queue of the method node to be analyzed by taking the program call tree as an input and the root node $m_a$ of the program call tree as an entry; when the queue is not empty, acquiring the method node in the queue, if a taint source of the node method is non-empty, indicating that a key module is found, and all subsequent nodes all are method nodes in the key module; if the taint source of the node method is empty, acquiring all sub-nodes thereof and adding the sub-nodes into a queue of the nodes to be analyzed; and finally, when the set is empty, ending the algorithm.

In a preferred embodiment, structures and calling processes of a native application and a target application are described first;

a core of a target program structure includes two elements: a method wrapper Method_T_Wrapper and a method proxy Method_T_Proxy, where an operating principle of the target program structure is as follows: direct call of Method_T by Method_I is converted into indirect call via the Method_T_Proxy; the Method_T_Wrapper completes the function as same as the Method_T, is responsible for executing true computation, transforms the Method_T, finds out external variable references thereof, and transforms the method into a form being introduced through parameters and returned through returned values, and the modified class method is stateless; the Method_T_Proxy is a proxy of the method Method_T, and external behaviors thereof are consistent with those of the Method_T, and the proxy does not perform actual computation, is responsible for determining an execution position of the method, and perform controlled forwarding and data synchronism.

In a preferred embodiment, the method wrapper is generated by the following steps:

(1) modifying the parameter list and the returned values of the method; increasing the parameters params, representing the external variables of the original method, wherein the external variables are introduced into a method body in a form of parameters; increasing the statements to assign the parameters params to global variables global_params, wherein all methods in the key module are capable to call external variables of the methods; and moreover, adding the global_params into a returned result, and being capable to return a change condition of the external variables to a method caller;

(2) modifying all statements access to the external variables in the method, replacing the external variable references c and d with corresponding input parameters global_params.c and global_params.d, where there are no statements access to the external variables in the method; and (3) modifying all return statements of the method, adding the parameters global_params into the returned result, wherein the change condition of the external variables can be returned to the method caller.

In a preferred embodiment, a construction rule for the method proxy is as follows:

(1) keeping a method signature and a return type of the method proxy consistent with those of the original method;

(2) increasing the statements for processing extra variables; constructing a variable params of a Params type, and assigning the params with external variable information of the method;

(3) increasing the statements to call the method wrapper in a fabric chain code; in a Hyperledger Fabric, calling the method wrapper Method_T_Wrapper in the chain code through a fabricManager object provided by sdk, and moreover, sending call parameters of the method wrapper; and (4) increasing the returned results called by a statement receiving method, wherein the external variables of the method are updated by using result data to guarantee the consistency of the program state, and moreover, returning a method call returned value to the caller thereof.

In a preferred embodiment, the application for JDBC refactoring uses a relationship database, a relationship table structure needs to be defined first for use of the application, and then related business codes of the application edited through JDBC API; a database operating node is an SQL statement in the node, a function of the database is operated through the JDBC API, and the statement is usually a landing point or a start point of the key data in the propagation path; the JDBC API is converted into a key value of a corresponding blockchain to operate API for the database, where a current mainstream open source blockchain architecture Fabric chaincode is targeted; and the Fabric chaincode uses a Couch DB key value database, and a refactoring method includes analysis and verification of the SQL statement and operational conversion from the SQL statement to CouchDB.

Compared with the prior art, the present invention has the following beneficial effect: the present invention provides an adaptive migration framework to promote the existing client-server architecture application to be migrated to the application based on the blockchain. First, the method includes the following steps: establishing the program call tree, constructing a program call tree of the whole application program from the main function through static code analysis, and marking the key data on the call tree; then, defining the taint propagation rule for taint analysis by taking key data as tainted data, to acquire all taint variables in an application program; and finally, identifying the key module of the application program on the program call tree in combination with the tainted path, and setting the code refactoring rule to perform code refactoring on the method in the key module according to the special program structure. The method is evaluated by way of exemplary studies, and experimental results show that the method can effectively improve the development efficiency of the blockchain application.

BRIEF DESCRIPTION OF THE DRAWINGS

FIG. 1A is a source program structure, and FIG. 1B is a target program structure;

FIGS. 2A-2B show a schematic diagram of generating steps of the method wrapper in the preferred embodiment of the present invention, where FIG. 2A is the source program, and FIG. 2B is the method wrapper; and FIGS. 3A-3B show a schematic diagram of a construction rule of a method proxy in the preferred embodiment of the present invention, where FIG. 3A is the source program, and FIG. 3B is the method proxy.

DETAILED DESCRIPTION OF THE EMBODIMENTS

Figures 1A, 1B:
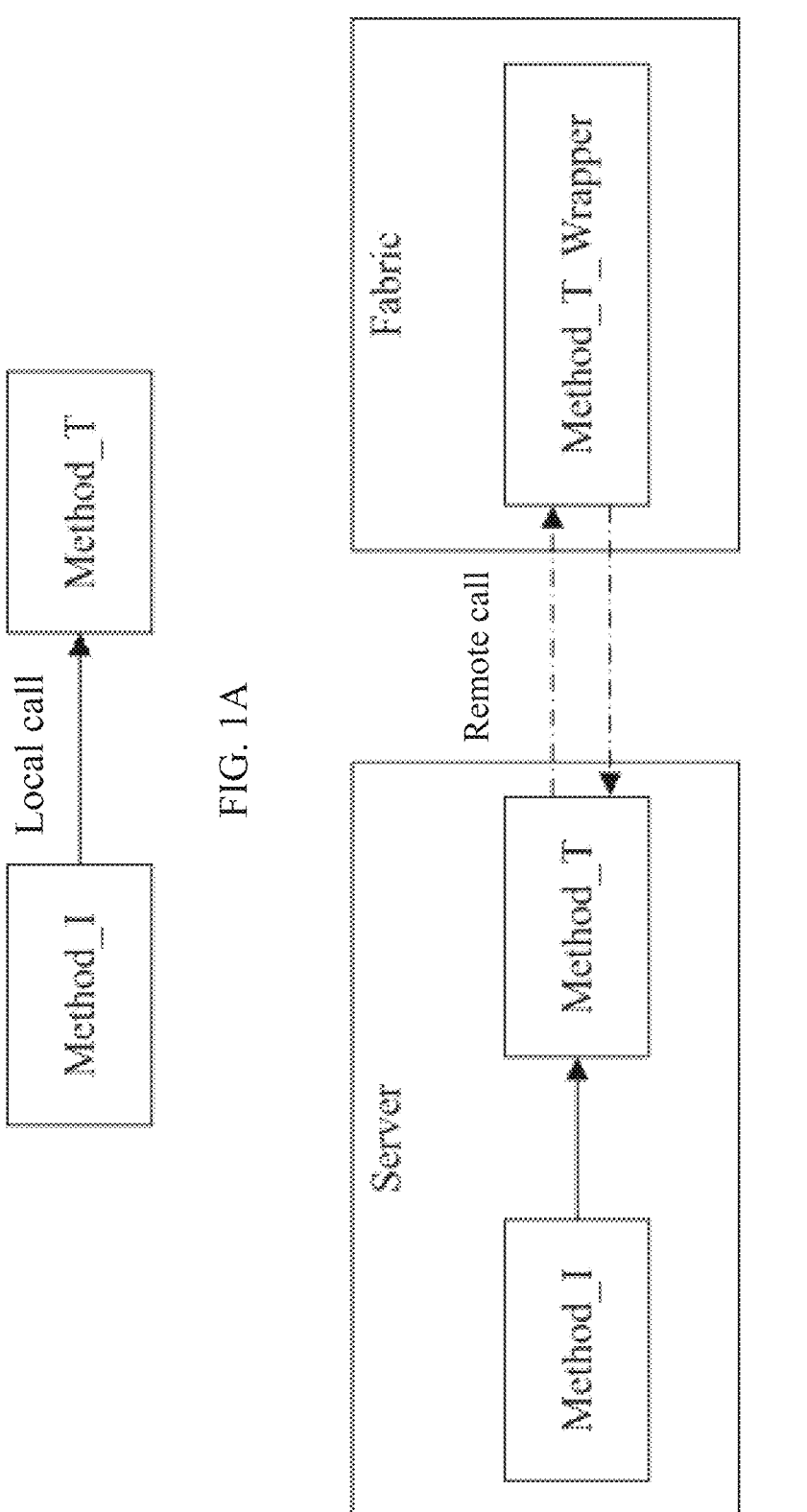
FIGS. 1A-1B show a schematic diagram where structures and calling processes of a native application and a target application are described according to a preferred embodiment of the present invention, where

Further description of the present invention will be made below in combination with drawings and embodiments.

It is to be noted that the detailed description below is exemplary and is intended to further describe the application. Unless specified otherwise, all technical and scientific terms used herein have the same meaning as commonly understood by those of ordinary skill in the art to which the application belongs.

It is to be noted that the terms used herein are merely used for describing specific embodiments, and are not intended to limit the exemplary embodiments according to the present application; as used herein, unless otherwise specified in the context, the singular form is further intended to include plural form. In addition, it is to be further understood that when the terms "comprise" and/or "include" are used in the description, it indicates that there are features, steps, operations, apparatuses, assemblies and/or their combinations.

An application migration method from client-server architecture to blockchain architecture includes the following steps: S1: modeling an application program of a conventional client-server architecture and abstracting the application program to a program call tree; S2: defining a taint propagation rule for taint analysis by taking key data as tainted data, to acquire all taint variables in the application program; and S3: identifying a key module of the application program on the program call tree according to a tainted path, and setting a code refactoring rule to perform code refactoring on a method in the key module according to a special program structure.

The step 1 specifically includes: establishing the program call tree, constructing the program call tree of the application program from the main function through static code analysis, and marking the key data on the program call tree; and definitions of the program call tree are as follows:

definition 1: the program structure of an application program of client-server architecture is represented as a program call tree $Tree_r(M, R, K)$, where $M= \{m_1, m_2, \ldots, m_n\}$ represents a node set of the program call tree; R represents a node call relationship set, any one $r_{mi-mj} \in R$ represents a side of the program call tree, representing that a method $m_i$ calls a method $m_j$ and $K=\{keydata_1, keydata_2, \ldots, keydata_n\}$ represents a key data set in a system;

definition 2: a method node of a program call tree includes a unique identifier and a call path of the method, a statement set of the method and a set of the key data in the method, and $m_i=<mSign_i, mPath, U_i, kset>$ is represented by a quaternion, where mSign represents the unique identifier of the method $m_i$, mPath represents a method call path from the main function to $m_i$, kset is used to record all key data in the method $m_i$, and $U_i$, represents the statement set of the method $m_i$;

definition 3: $mSign_i=\{mSig|mName,mParams,returnParams\}$ represents the unique identifier of a method node of a program call tree; where mName represents a method name, mParams represents an entry parameter list of the method, and returnParams represents returned parameters of the method;

definition 4: $mPath=\{mSig_{main},mSig_a, \ldots, mSig_i\}$ represents the call path of a program call tree method $m_i$, a combination of the unique identifiers of the method node from $m_{main}$ to $m_i$, uniquely forming a path accessible to $m_i$;

definition 5:

$$U_i = \{u_i^1, u_i^2, \ldots, u_i^n\}$$

represents the statement set of the method node $m_i$ on the program call tree, where $$u_i^j$$

represents the $j^{th}$ statement of the method $m_i$; and definition 6: the key data of a system includes the unique identifier of the key data in the method and a key data name, and $eydata_i=\{mSign_i, kname\}$ is represented by a two-tuple, where kname represents a variable in the method $m_i$ with a name of kname, and variables on a data flow branch where all key data is located may be key variables.

The program call tree extraction algorithm is shown as follows:

Program call tree extraction algorithm
Input:

A $m_{main}$ method whose statements are $U_{main} = \{u_{main}^1, u_{main}^2, u_{main}^3\}$ Output:
  A program call tree $Tree_{main} = (M, R)$
Declare:

getMethod$(u_x^i)$: A method which gets signature of a method from $u_x^i$ getUnits(signature): A method which gets statement of a method according to its signature

```
1.      M←M + m_main, R←∅
2.      function getTree(m_a, U_a)
3.          for each u_a^i ∈ U_a do
4.              keywords←Soot(u_a^i)
5.              if ∃"invoke" ∈ keywords then
6.                  mSig←getMethod(u_a^i)
7.                  cSeq←m_a, cSeq + mSig
8.                  m_s←<mSig, cSeq>
9.                  U_s←getUnits(mSig)
10.                 M←M + m_s
11.                 if<m_a, m_s>∈ R.key then
12.                     ++r_ma-ms
13.                 else
14.                     r_ma-ms←1
15.                     R←R + r_ma-ms
16.                 end if
17.                 getTree(m_s, U_s)
18.             end if
19.         end for
20.     end function
```

The algorithm describes the extraction process of the program call tree. The algorithm constructs a program call tree of an application taking $m_{main}$ as a root by taking the main function $m_{main}$ as an entry point of the application, a HashMap is used to record a R, a storage form of key is <$m_i$, $m_j$>, formula represents that $m_i$ calls $m_j$ and a value corresponding thereto represents a number of times when $m_i$ calls $m_j$. For the entry point $m_{main}$ of the input program of the algorithm and the statement set $U_{main}$ of $m_{main}$, any $$u_{main}^i \in U_{main}$$

represents the $i^{th}$ statement of $U_{main}$. The program call tree is constructed recursively in lines 2-20 by calling a method getTree( ), where parameters $m_a$ and $U_a$ are written into the method, respectively representing a method to be analyzed and the statement set of the method. A Soot key word of $$u_a^i$$

is acquired in the 4th line, i.e., an intermediate code defined in Soot, for example, an invoke keyword represents that this is a method call statement, and an intact keyword definition can refer to a Soot manual. If the statement contains the keyword called by the method, a set M is updated in lines 6-10 to record that the method $m_a$ calls the method $m_s$. A set R is updated in lines 11-16 to record a method call relationship and update a weight. The method $m_s$ is subjected to getTree( ) recursion in the $17^{th}$ line. When the recursion process is ended, the algorithm outputs the program call tree.

Step 2:

| Statement type | Rule | Description (a is the key data or taint source, and b is the variable) | Conclusion |
|---|---|---|---|
| Alias | (1) b = a | a is the object reference | b is the taint source |
| Assign statement | (2) a = b | a is the basic data type | b is the taint source |
| | (3) a = b | a is the object reference | b is the taint source |
| | (4) a.f = b | f is a data member of the object a | b is the taint source |
| | (5) a = b.f | b is the object reference | b is the taint source |
| | (6) a = €(v₁, v₂ . . . vₙ) | € is a multivariate operator | $v_1, v_2 \ldots v_n$ are the taint |
| Method declaration statement | (8) Object function(Object a, Object obj2 . . .) | a is the object reference | An actual parameter corresponding to a formal parameter a of the function method is the taint source |
| Method call statement | (9) function(para1 = a, para2 = b . . .) | a is the object reference, function is not Java API | Para1 in the function method is the taint source |
| Method return statement | (10) a = function(b) | function() is not Java API | The returned value called by this function method is the taint source |
| | a = b.function(c) | function() is not Java API | The returned value called by this function method is the taint source |

-continued

| SQL statement | a = "select filed from table where . . . " + v1 + v2 . . . + vn | a is the object reference | a, $v_1$, $v_2$ . . . $v_n$ are the taint sources, table is the key table |
| | a = "insert into table(filed1, filed2 . . .) values(val1, val2 . . .) " + v1 + v2 . . . + vn | a is the object reference | a, $v_1$, $v_2$ . . . $v_n$ are the taint sources, table is the key table |
| | a = "update table set $field_1$ = $val_1$, $field_2$ = $val_2$, . . ." + $v_1$ + $v_2$ . . . + $v_n$ | a is the object reference | a, $v_1$, $v_2$ . . . $v_n$ are the taint sources, table is the key table |
| | a = "delete from table where . . ." + v1 + v2 . . . + vn | a is the object reference the key table) | a, $v_1$, $v_2$ . . . $v_n$ are the taint sources, table is the key table |

| Statement type | Rule | Description (table is the key table) | Conclusion |
|---|---|---|---|
| SQL statement | a = "select filed from table where . . ." + v1 + v2 . . . + vn | a is the object reference | a, $v_1$, $v_2$ . . . $v_n$ are the taint sources |
| | a = "insert into table(filed1, filed2 . . .) values(val1, val2 . . .)" + v1 + v2 . . . + vn | a is the object reference | a, $v_1$, $v_2$ . . . $v_n$ are the taint sources |
| | a = "update table set $field_1$ = $val_1$, $field_2$ = $val_2$, . . ." + $v_1$ + $v_2$ . . . + $v_n$ | a is the object reference | a, $v_1$, $v_2$ . . . $v_n$ are the taint sources |
| | a = "delete from table where . . ." + v1 + v2 . . . + vn | a is the object reference | a, $v_1$, $v_2$ . . . $v_n$ are the taint sources |

The above table exhibits the taint propagation rule defined, where the assignment statement rule and the alias statement rule induce various modes of propagation of taint variables in a method; the method call statement rule, the method return statement rule and the method statement rule describe the propagation mode of a taint variable cross-method; the sql rule induces a situation that the taint variables are finally gathered in a database table, and in this case, the table is the key table, so that a situation that the key table is operated to introduce a new taint variable is complementarily induced.

To find out all the taint sources, it is needed to analyze each statement in the program according to the taint propagation rule. First, for each method node containing the key data, each statement in the method is analyzed according to the taint propagation rule. When the statement meets any taint propagation rule, it indicates that a new taint source is found, and the new taint source is added into a taint source set of the method for recording. When the statement meets the method call statement rule, the method return statement rule or the method statement rule, it indicates that a new method node to be analyzed is generated, and it is needed to add the method node into the set of the method node to be analyzed for recording. After a round of analysis of all statements of the method is ended, if the new taint source is added into the taint source set of the method, a new round of iteration is started to analyze the method. Finally, the set of the method node to be analyzed is traversed to analyze each method node in the set one by one. The taint propagation analysis algorithm is shown as follows:

Taint propagation analysis algorithm

Input: the method node set containing the key data $M_K$, the program call tree $Tree_{main}$=(M,R,K)
Output: the program call tree recording all taint sources
Description: N_Set records the method node to be analyzed, T_Set records the processed data table, and temp_Set records the data table to be analyzed.
　　　taint_source represents a taint source, and get_parents_method(m) acquires a father node of the method node m on the program call tree.

```
1.    initialize N_Set, T_Set
2.    function taint_analysis( )
3.        while !MK.isEmpty( ) do
4.            N_Set.add(MK)
5.            MK.clear( )
6.            while !N_Set.isEmpty( ) do
7.                m=N_Set.pop( )
8.                method_analysis(m)
9.            end while
10.           temp_Set= temp_Set- temp_Set∩T_Set
11.           if !temp_Set.isEmpty( ) do //
12.               for each mi in M do
13.                   method_analysis2(mi)
14.               end for
15.           end if
16.           T_Set.add(temp_Set)
17.           temp_Set.clear( )
18.       end while
19.   end function
```

-continued

| Taint propagation analysis algorithm |
| --- |

```
20.   function method_analysis(m)
21.      old_count = m.kset.size( )   //record the number of the taint sources in the taint source set
      before method analysis
22.      for each u in U_m do      //analyze each statement in the method m one by one
23.         switch get_stmt_rule(u)
24.            case assign_stmt        //assign the statement rule
25.               taint_source=get_ assign _source(u)   //acquire the new taint source
26.               if !m.kset.contains(taint_source)
27.                  m.kset.add(taint_source)        //add the new taint source in the set
28.               end if
29.               break
30.            case assign_stmt      //alias statement rule
31.               taint_source=get_alias_source(u)
32.               if !m.kset.contains(taint_source)
33.                  m.kset.add(taint_source)
34.               end if
35.               break
36.            case invoke_stmt   //method call statement rule
37.               m_s= get_method(u)        //acquire the call method in the statement
38.               taint_source=get_invoke_source(u)
39.               if !m_s.kset.contains(taint_source)
40.                  N_Set.add(m_s)
41.                  m_s.kset.add(taint_source)
42.               end if
43.               break
44.            case return_stmt   //method return statement rule
45.               m_s= get_method(u)
46.               taint_source=get_ return _source(u)
47.               if !m_s.kset.contains(taint_source)
48.                  N_Set.add(m_s)
49.                  m_s.kset.add(taint_source)
50.               end if
51.               break
52.            case declar_stmt   //method declaration statement rule
53.               m_s= get_parents_method(m)
54.               taint_source=get_declar_source(u)
55.               if !m_s.kset.contains(taint_source)
56.                  N_Set.add(m_s)
57.                  m_s.kset.add(taint_source)
58.               end if
59.               break
60.            case assign_stmt      //sql statement rule
61.               table=regex_get_sql(u) //acquire the data table in the sql statement
62.               if !temp.set.contains(table) && !T_Set.contains(table) do
63.                  temp_Set.add(table)
64.               end if
65.               taint_source=get_sql_source(u)
66.               if !m.kset.contains(taint_source)
67.                  m.kset.add(taint_source)
68.               end if
69.               break
70.         end switch
71.      end for
72.      now_count= m.kset.size( )
73.      if now_count > old_count   //iteratively analyze the method if the new taint source is
      generated
74.         method_analysis(m)
75.      end if
76.   end funciton
77.   function method_analysis2(m)
78.      for each u in U_m do
79.         switch get_stmt_rule(u)
80.            case assign_stmt        //sql query statement
81.               m.type= "jdbc_query"
82.               break
83.            case assign_stmt       //sql insert statement
84.               taint_source=get_ sql_insert _source(u)
85.               if !m.kset.contains(taint_source)
86.                  m.kset.add(taint_source)
87.                  Mk.add(m)
88.               end if
89.               break
90.            case assign_stmt       //sql alter statement
91.               taint_source=get_declar_source(u)
```

-continued

| Taint propagation analysis algorithm |
| --- |
| 92.         if !m.kset.contains(taint_source) |
| 93.           m.kset.add(taint_source) |
| 94.           Mk.add(m) |
| 95.         end if |
| 96.         break |
| 97.       case assign_stmt     //sql delete statement |
| 98.         taint_source=get_declar_source(u) |
| 99.         if !m.kset.contains(taint_source) |
| 100.           m.kset.add(taint_source) |
| 101.           Mk.add(m) |
| 102.         end if |
| 103.         break |
| 104.       end switch |
| 105.     end for |
| 106.   end function |

Step 3:

3.1 Key Module Identification

The key code module is the target objective which achieves adaptive migration from client-server architecture to blockchain architecture, which is an explanation of the key data calling the key code module in the program call tree: when a kset set of a method node $m_{cur}$ is non-empty and a kset set of a father method node thereof is empty, a sub-tree with $m_{cur}$ as a root node is taken as a key code module of the application. A specific definition of the key code module is as follows:

definition 7: the key code module of the application program is represented as Module=(module$_1$, module$_2$ . . . module$_n$), Module∈Tree$_r$. module$_i$ is a sub-tree of the Tree$_{main}$, representing a key code module of the application program, which can be represented as module$_i$=<M,R>(if i≠j, module$_i$∩module$_j$=∅).

Key Module Partitioning Algorithm node method is empty, all sub-nodes thereof are acquired and the sub-nodes are added into a queue of the nodes to be analyzed; and finally, when the set is empty, the algorithm is ended.

3.2 Program Structure

Referring to FIGS. 1A-1B, structures and calling processes of a native application and a target application are described first.

A core of a target program structure includes two elements: a method wrapper Method_T_Wrapper and a method proxy Method_T_Proxy, where an operating principle of the target program structure is as follows:

(1) direct call of Method_T by Method_I is converted into indirect call via the Method_T_Proxy;

(2) the Method_T_Wrapper completes the function as same as the Method_T, is responsible for executing true computation, transforms the Method_T, finds out external variable references thereof, and transforms the method into a form being introduced through param-

| | |
| --- | --- |
| Input: | Program call tree Tree$_{main}$=(M,R,K) |
| Output: | Key module set P |
| Description: | queue records the method node to be analyzed |
| | get_parent_method( ) acquires the father method node of the method node according to the program call tree |
| | get_child_method( ) acquires the child method node of the method node according to the program call tree |
| 1. | function get_key_path( ) |
| 2. |     initialize queue |
| 3. |     queue.add(m$_a$)     //add the root node into the node set to be analyzed |
| 4. |     while !queue.isEmpty( ) do |
| 5. |         m=queue.poll( ) |
| 6. |         if !m.kset.isEmpty( ) then     //when the taint source of the method node m is not empty |
| 7. |         mpost=get_post(m)     //acquire the sub-tree with the method node m as the root |
| 8. |         P.add(mpost) |
| 9. |         else |
| 10. |         mpost=get_post(m)     //acquire the sub node set of the method node m |
| 11. |         for each m$_{child}$ in Mchildren |
| 12. |           queue.add(m$_{chita}$) |
| 13. |         end for |
| 14. |         end if |
| 15. |     end while |
| 16. |   end function |

The key module is identified, where first, the root node $m_a$ is added into a queue of the method node to be analyzed by taking the program call tree as an input and the root node $m_a$ of the program call tree as an entry; when the queue is not empty, the method node in the queue is acquired, if a taint source of the node method is non-empty, it indicates that a key module is found, and all subsequent nodes all are method nodes in the key module; if the taint source of the eters and returned through returned values, and the modified class method is stateless; and (3) the Method_T_Proxy is a proxy of the method Method_T, and external behaviors thereof are consistent with those of the Method_T, and the proxy does not perform actual computation, is responsible for determining an execution position of the method, and perform controlled forwarding (remote call) and data synchronism (including: initializing and serializing the actual parameter data needed to execute the method wrapper, and deserializing the returned values of the method wrapper to update corresponding local variables).

3.3 Method Wrapper

The method wrapper is generated by the following steps:

(1) A parameter list and returned values of the method are modified. As shown in FIG. 2A and the 2nd line of FIG. 2B, the parameters params are increased, representing the external variables of the original method, where the external variables are introduced into a method body in a form of parameters; the statements increased to assign the parameters params to global variables global_params, where all methods in the key module are capable to call external variables of the methods; and moreover, the global_params are added into a returned result, and are capable to return a change condition of the external variables to a method caller; moreover, the global_params are added into the returned result, where the change condition of the external variables can be returned to the method caller;

(2) all statements access to the external variables in the method are modified, as shown in the line 3 of FIG. 2A and the line 6 of FIG. 2B, the external variable references c and d are replaced with corresponding input parameters global_params.c and global_params.d, where there are no statements access to the external variables in the method; and (3) all return statements of the method are modified, as shown in the line 4 of FIG. 2A and the lines 7-10 of FIG. 2B, the parameters global_params are added into the returned result, where the change condition of the external variables can be returned to the method caller.

3.4 Method Proxy

A construction rule for the method proxy is as follows:

(1) a method signature (name and parameter list) and a return type of the method proxy are kept consistent with those of the original method;

(2) statements are increased for processing extra variables; a variable params of a Params type is constructed, and the params are assigned with external variable information of the method;

(3) statements are increased to call the method wrapper in a fabric chain code; in a Hyperledger Fabric, a Java application can use Fabric-Sdk-Java to achieve access to the chain code, the method wrapper in the chinacode is called through a fabricManager object provided by sdk, and moreover, call parameters of the method wrapper are sent; and (4) the returned results called are increased by a statement receiving method, where the external variables of the method are updated by using result data to guarantee the consistency of the program state, as shown in lines 11-12 in FIGS. 3A-3B; Moreover, a method call returned value is returned to the caller thereof, as shown in line 13 in FIGS. 3A-3B.

3.5 JDBC Refactoring

The application program usually uses a relationship database, a relationship table structure needs to be defined first for use of the application program, and then related business codes of the application program edited through JDBC API. A database operating node is an SQL statement in the node, a function of the database is operated through the JDBC API, and the statement is usually a landing point or a start point of the key data in the propagation path.

Because most databases of blockchain use key value databases and do not support SQL operation, the JDBC API is needed to be converted into a key value of a corresponding blockchain to operate API for the database in refactoring, where a current mainstream open source blockchain architecture Fabric chaincode is targeted.

The Fabric chaincode uses a Couch DB key value database, and a refactoring method includes analysis and verification of the SQL statement and operational conversion from the SQL statement to CouchDB.

Experimental Evaluation

To verify validness and feasibility of the method, the method herein is experimentally evaluated. 10 web open source applications are collected from github and a joint development network, with an experimental environment shown as follows:

| Tool name | Edition number | Description |
|---|---|---|
| hyperledger fabric | 2.2.5 | Hyperledger |
| docker | 20.10.20 | Containerized management tool |
| docker-compose | 1.24.1 | Containerized deployment tool |
| java | 1.8.0 | Programming language |

Application performance comparison: by comparing the blockchain application reconstructed by the method with the blockchain application developed by a professional in performance, the read-write performance of the application is mainly evaluated. An Apache organizes a pressure test tool Apache JMeter developed based on Java to test the pressure of the Web application, and a test index is transactions per second (tps). Two solutions of each system are subjected to 10-time pressure tests, and a mean value is taken. An experimental result shows that the performance loss is within 8% while the development efficiency of the blockchain application is improved when the blockchain application is developed by using the framework.

| | Native solution | The method | |
|---|---|---|---|
| Ideal crowdfunding system | 39.6 | 37.0 | 6.57% |
| Lottery system | 41.4 | 38.5 | 7.00% |
| Electronic invoice cloud platform | 53.2 | 50.1 | 5.82% |
| Agricultural product traceability system | 52.2 | 48.9 | 6.32% |
| Electronic certificate | 50.4 | 47.5 | 5.75% |
| Electronic medical system | 53.8 | 49.2 | 8.92% |
| Food traceability system | 51.9 | 48.9 | 5.78% |
| Second-hand car trading system | 40.0 | 36.7 | 8.35% |
| House renting system | 40.8 | 38.6 | 5.39% |
| Drug tracing | 53.9 | 49.5 | 8.16% |

What is claimed is:

1. An application migration method from a client-server architecture to a blockchain architecture, comprising the following steps:

S1: modeling an application program of a client-server architecture and abstracting the application program to a program call tree;

S2: defining a taint propagation rule for taint analysis by taking key data as tainted data, to acquire all taint variables in the application program; and S3: identifying a key module of the application program on the program call tree according to a tainted path, and based on a code refactoring rule, perform code refactoring on a method in the key module according to a special program structure, wherein the S1 comprises: establishing the program call tree, constructing the program call tree of the application program from a main function through static code analysis, and marking the key data on the program call tree; and definitions of the program call tree are as follows:

definition 1: a program structure of the application program of the client-server architecture is represented as a program call tree $Tree_r=(M, R, K)$, wherein $M=\{m_1, m_2, \ldots, m_n\}$ represents a node set of the program call tree; R represents a node call relationship set, any one $r_{mi-mj} \in R$ represents a side of the program call tree, representing that a method $m_i$ calls a method $m_j$; and $K=\{keydata_1, keydata_2, \ldots, keydata_n\}$ represents a key data set in a system;

definition 2: a method node of the program call tree comprises a unique identifier and a call path of the method, a statement set of the method and a set of the key data in the method, and $m_i=<mSign_i, mPath, U_i, kset>$ is represented by a quaternion, wherein mSign represents the unique identifier of the method $m_i$, mPath represents a method call path from the main function to $m_i$, kset is configured to record all key data in the method $m_i$, and $U_i$ represents the statement set of the method $m_i$;

definition 3: $mSign_i=\{mSig|mName,mParams,returnParams\}$ represents the unique identifier of the method node of the program call tree, wherein mName represents a method name, mParams represents an entry parameter list of the method, and returnParams represents return parameters of the method;

definition 4: $mPath=\{mSig_{main}, mSig_a, \ldots mSig_i\}$ represents the call path of the program call tree method $m_i$, a combination of the unique identifiers of the method node from $m_{main}$ to $m_i$, uniquely forming a path accessible to $m_i$;

definition 5:

$$U_i = \{u^1, u^2, \ldots, u_i^n\}$$

represents the statement set of the method node $m_i$ on the program call tree, wherein $$u_i^j$$

represents a $j^{th}$ statement of the method $m_i$; and definition 6: the key data of the system comprises the unique identifier of the key data in the method and a key data name, and $eydata_i=\{mSign_i, kname\}$ is represented by a two-tuple, wherein kname represents a variable in the method $m_i$ with a name of kname, and variables on a data flow branch where all key data is located are allowed to be key variables.

2. The application migration method from the client-server architecture to the blockchain architecture according to claim 1, wherein an algorithm extracted by the program call tree constructs a program call tree of an application program taking $m_{main}$ as a root by taking the main function $m_{main}$ as an entry point of the application program, a HashMap is configured to record a R, a storage form of key is $<m_i, m_j>$, formula represents that $m_i$ calls $m_j$, and a value corresponding thereto represents a number of times when $m_i$ calls $m_j$;

for the entry point $m_{main}$ of an input program of the algorithm and the statement set $U_{main}$ of $m_{main}$, any $$u_{mean}^i \in U_{main}$$

represents an $i^{th}$ statement of $U_{main}$;

the program call tree is constructed recursively by calling a method getTree( ), wherein parameters $m_a$ and $U_a$ are written into the method, respectively representing a method to be analyzed and the statement set of the method;

wherein a Soot key word of $$u_a^i$$

is acquired, comprising an intermediate code defined in Soot, a set M is updated to record that a method $m_a$ calls a method $m_s$; a set R is updated to record a method call relationship and update a weight; the method $m_s$ is subjected to getTree( ), recursion; and when a recursion process is ended, the algorithm outputs the program call tree.

3. The application migration method from the client-server architecture to the blockchain architecture according to claim 1, wherein an assignment statement rule and an alias statement rule in the taint propagation rule in the S2 summarize various ways of a taint variables propagation in the method;

a method call statement rule, a method return statement rule and a method declaration statement rule describe cross-method propagation modes of the taint variables;

for each method node containing the key data, each statement in the method is analyzed according to the taint propagation rule, and when the statement meets any taint propagation rule, it is indicated that a new taint source is found, and the new taint source is added into a taint source set for recording;

wherein when the statement meets the method call statement rule, the method return statement rule or the method declaration statement rule, it is indicated that a new method node to be analyzed is generated, and the method node needs to be added into a set of the method node to be analyzed for recording;

after a round of analysis of all statements of the method is ended, if the new taint source is added into the taint source set, a new round of iteration is started to analyze the method; and the set of the method node to be analyzed is traversed to analyze each method node in the set one by one.

4. The application migration method from the client-server architecture to the blockchain architecture according to claim 1, wherein the S3 comprises key module identification, program structure and method wrapper generation, method proxy construction, and Java Data Base Connectivity (JDBC) refactoring.

5. The application migration method from the client-server architecture to the blockchain architecture according to claim 4, wherein the step of the key module identification comprises: when a kset set of a method node $m_{cur}$ is non-empty and a kset set of a father method node thereof is empty, taking a sub-tree with $m_{cur}$ as a root node as a key code module of the application program, wherein the key code module is defined as follows:

definition 7: the key code module of the application program is represented as Module=(module$_1$, module$_2$ . . . module$_n$), Module∈Tree$_r$, wherein module$_i$ is a sub-tree of Tree$_{main}$, representing a key code mode of the application program and being represented as module$_i$=<M,R>(if i≠j, module$_i$∩module$_j$=∅);

identifying the key module: adding the root node m$_a$ into a queue of the method node to be analyzed by taking the program call tree as an input and the root node m$_a$ of the program call tree as an entry;

when the queue is not empty, acquiring the method node in the queue, if a taint source of a node method is non-empty, indicating that the key module is found, and all subsequent nodes all are method nodes in the key module;

if the taint source of the node method is empty, acquiring all sub-nodes thereof and adding the sub-nodes into a queue of the nodes to be analyzed; and when the set is empty, ending an algorithm.

6. The application migration method from the client-server architecture to the blockchain architecture according to claim 4, wherein structures and calling processes of a native application program and a target application program are described first;

a core of a target program structure comprises two elements: a method wrapper Method_T_Wrapper and a method proxy Method_T_Proxy, wherein an operating principle of the target program structure is as follows: direct call of Method_T by Method_I is converted into indirect call via the Method_T_Proxy;

the Method_T_Wrapper completes a function as same as the Method_T, is responsible for executing true computation, transforms the Method_T, finds out external variable references thereof, and transforms the method into a form being introduced through parameters and returned through returned values, and a modified class method is stateless; and the Method_T_Proxy is a proxy of the method Method_T, and external behaviors thereof are consistent with external behaviors of the Method_T, and the proxy does not perform actual computation, is responsible for determining an execution position of the method, and perform controlled forwarding and data synchronism.

7. The application migration method from the client-server architecture to the blockchain architecture according to claim 4, wherein a method wrapper is generated by the following steps:

1) modifying a parameter list and returned values of the method; increasing parameters params, representing external variables of an original method, wherein the external variables are introduced into a method body in a form of parameters; increasing the statements to assign the parameters params to global variables global_params, wherein all methods in the key module are allowed to call the external variables of the methods; and adding the global_params into a returned result, and being allowed to return a change condition of the external variables to a method caller;

2) modifying all statements access to the external variables in the method, replacing external variable references c and d with corresponding input parameters global_params.c and global_params.d, wherein there are no statements access to the external variables in the method; and 3) modifying all return statements of the method, adding the parameters global_params into the returned result, wherein the change condition of the external variables is allowed to be returned to the method caller.

8. The application migration method from the client-server architecture to the blockchain architecture according to claim 4, wherein a construction rule for a method proxy is as follows:

1) keeping a method signature and a return type of the method proxy consistent with a method signature and a return type of the original method;

2) increasing statements for processing extra variables; constructing a variable params of a Params type, and assigning the params with external variable information of the method;

3) increasing the statements to call a method wrapper in a fabric chain code; in a Hyperledger Fabric, calling the method wrapper Method_T_Wrapper in the chain code through a fabricManager object provided by sdk, and sending call parameters of the method wrapper; and 4) increasing returned results called by a statement receiving method, wherein external variables of the method are updated by using result data to guarantee a consistency of a program state, and returning a method call returned value to a caller thereof.

9. The application migration method from the client-server architecture to the blockchain architecture according to claim 4, wherein the application program for JDBC refactoring uses a relationship database, a relationship table structure needs to be defined first for use of the application program, and related business codes of the application program edited through JDBC API;

a database operating node is an SQL statement in a node, a function of the relationship database is operated through the JDBC API, and the statement is a landing point or a start point of the key data in a propagation path;

the JDBC API is converted into a key value of a corresponding blockchain to operate API for the relationship database, wherein a current mainstream open source blockchain architecture Fabric chaincode is targeted; and the Fabric chaincode configures a Couch DB key value database, and a refactoring method comprises analysis and verification of the SQL statement and operational conversion from the SQL statement to the Couch DB.

\* \* \* \* \*